(No Model.)
C. A. STOKES.
AUXILIARY SEAT FOR BICYCLES.
No. 548,621. Patented Oct. 22, 1895.
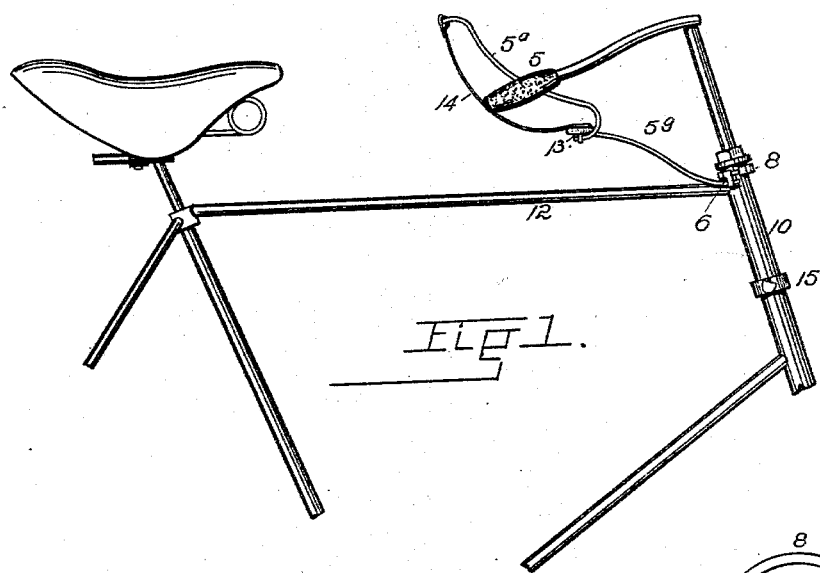
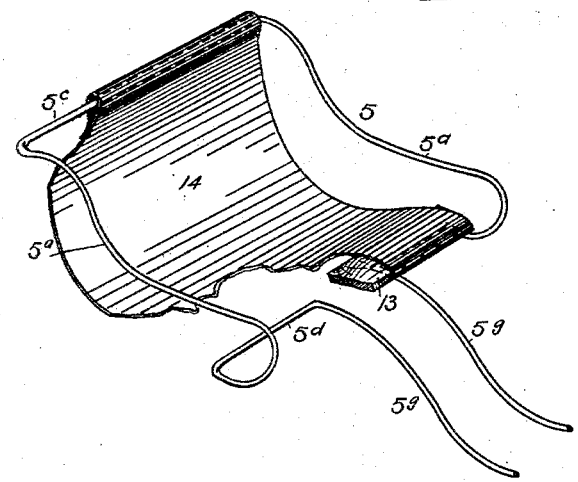
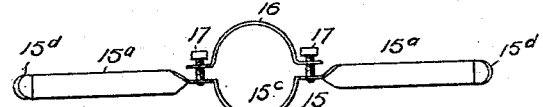
WITNESSES:
INVENTOR
Chas. A. Stokes
BY
ATTORNEY

UNITED STATES PATENT OFFICE.

CHARLES A. STOKES, OF DENVER, COLORADO.

AUXILIARY SEAT FOR BICYCLES.

SPECIFICATION forming part of Letters Patent No. 548,621, dated October 22, 1895.

Application filed December 3, 1894. Serial No. 530,664. (No model.)

*To all whom it may concern:*

Be it known that I, CHARLES A. STOKES, a citizen of the United States of America, residing at Denver, in the county of Arapahoe and State of Colorado, have invented certain new and useful Improvements in Auxiliary Seats for Bicycles; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in auxiliary seats for bicycles. This device is adapted for attachment to the front bar of the bicycle, and its function or use is to enable a child to accompany the rider of a safety-bicycle.

My object is to provide a device of this class which shall be of simple and economical construction, reliable, durable, and efficient in use.

To this end the improvement consists of the features hereinafter described and claimed, all of which will be fully understood by reference to the accompanying drawings, in which is illustrated an embodiment thereof.

In the drawings, Figure 1 illustrates the device attached to a bicycle. Fig. 2 is a perspective view of the device in detail, the same being detached from the clamp and partly broken away. Figs. 3 and 4 illustrate the fastening-clamp. Fig. 5 is a detail view of the foot-rest employed in connection with the auxiliary seat.

Similar reference-characters indicate corresponding parts in the views.

Let the numeral 5 designate the frame of the seat, which is formed from a single piece of wire and comprises the sides $5^a$, the back $5^c$, the front parts $5^d$, and the forwardly-extending arms $5^g$, whose extremities engage apertures $6^a$, formed in the depending lugs $6^c$ of the clamp part 6. The arms $5^g$ are fastened to the clamp by means of set-screws 7, inserted in threaded apertures formed in the lugs $6^c$ at right angles to the apertures $6^a$. By means of the set-screws the position of the seat may be adjusted at will.

The clamp part 6 is connected with the clamp part 8 by means of screw-bolts 9. The bolts are inserted in plain apertures formed in the part 6 and engage threaded apertures formed in the part 8. The clamp parts 6 and 8 are shaped to fit the front bar 10 of the bicycle-frame, to which they are attached just above the top horizontal bar 12, whereby the last-named bar supports the clamp from below and overcomes any tendency on the part of the clamp to slip downward on the bar 10.

To the front part of the wire frame is attached the wood strip 13, to which is secured the front edge of a suitable covering 14 for the frame. This strip 13 is placed on top of the frame and is preferably secured thereto by means of staples $13^a$, which straddle the wire. These staples should be driven through the strip 13 from the under side and clinched on top. The clinched staple ends are concealed by the covering hereinafter described. As shown in the drawings, this covering 14 may consist of some flexible fabric having sufficient strength and durability for the purpose required. The rear edge of this covering is passed around the rear part $5^c$ of the frame and fastened in any suitable manner.

The foot-rest 15 is composed of metal, and comprises two projecting parts $15^a$, connected by a central part $15^c$, shaped to fit the front bar 10 of the bicycle-frame, to which the foot-rest is attached by means of a semicircular clamp part 16, connected with the central part of the foot-rest by means of screws 17, which enter coinciding apertures formed in the connected parts. The outer extremities of the foot-rest are turned up to form stops $15^d$, whereby the feet are prevented from accidentally slipping outward off the parts $15^a$, upon which they rest. This part is vertically adjustable on the front bar 10. Hence its position may be adjusted to accommodate children of different ages or sizes.

By an inspection of the drawings it will be observed that the arms $5^g$ of the wire frame have a compound curve. By reason of this curvature of the arm extremities the position of the auxiliary seat may be adjusted by moving the arms back and forth in the apertures $6^a$ of the clamp.

Having thus described my invention, what I claim is—

As an improved article of manufacture, an auxiliary bicycle seat comprising a frame formed from a single piece of wire and having the parallel sides $5^a$, the back $5^c$ connecting the rear extremities of the sides, the front parts $5^d$, $5^d$ which approach each other, the parallel arms $5^g$, $5^g$ which extend forward from the inner extremities of the parts $5^d$, said arms having the shape of a compound curve, a wood strip laid upon the front of the wire frame and secured thereto by means of staples or other suitable fastening devices, a piece of flexible material attached to the back of the wire frame and to the wood strip, a clamp, one part of which is horizontally apertured to receive the curved extremities of the seat arms $5^g$, and suitable set screws for locking the arms $5^g$ in any desired position of adjustment, substantially as described.

In testimony whereof I affix my signature in the presence of two witnesses.

CHARLES A. STOKES.

Witnesses:
CHAS. E. DAWSON,
ALFRED J. O'BRIEN.